United States Patent
Okutani et al.

(10) Patent No.: US 9,741,985 B2
(45) Date of Patent: Aug. 22, 2017

(54) SEALING PLATE FOR PRISMATIC SECONDARY BATTERY, METHOD FOR PRODUCING THE SAME, AND PRISMATIC SECONDARY BATTERY USING THE SAME

(71) Applicant: SANYO Electric Co., Ltd., Daito-shi, Osaka (JP)

(72) Inventors: Eiji Okutani, Kasai (JP); Yoshinori Yokoyama, Kasai (JP); Takayuki Hattori, Kasai (JP); Yasuhiro Yamauchi, Kasai (JP)

(73) Assignee: SANYO Electric Co., Ltd., Daito-shi (JP)

( * ) Notice: Subject to any disclaimer, the term of this patent is extended or adjusted under 35 U.S.C. 154(b) by 239 days.

(21) Appl. No.: 14/614,821

(22) Filed: Feb. 5, 2015

(65) Prior Publication Data

US 2015/0147606 A1 May 28, 2015

Related U.S. Application Data

(63) Continuation of application No. 13/550,982, filed on Jul. 17, 2012, now Pat. No. 8,991,232.

(51) Int. Cl.
| | |
|---|---|
| *H01M 2/12* | (2006.01) |
| *H01M 2/02* | (2006.01) |
| *H01M 2/04* | (2006.01) |
| *H01M 2/36* | (2006.01) |
| *B21K 23/00* | (2006.01) |

(52) U.S. Cl.
CPC ......... *H01M 2/1223* (2013.01); *H01M 2/024* (2013.01); *H01M 2/043* (2013.01);
(Continued)

(58) Field of Classification Search
CPC .... H01M 2/1223; H01M 2/024; H01M 2/043; H01M 2/362; H01M 2/12; H01M 2220/20; B21K 23/00; B21D 17/02; B21D 28/24
See application file for complete search history.

(56) References Cited

U.S. PATENT DOCUMENTS

| | | | | |
|---|---|---|---|---|
| 3,406,866 A | * | 10/1968 | Jasper | B21D 51/383 220/270 |
| 3,500,939 A | * | 3/1970 | Bozek | B21D 51/383 413/14 |

(Continued)

OTHER PUBLICATIONS

U.S. Non-Final Office Action dated Jun. 18, 2014, issued in corresponding U.S. Appl. No. 13/550,982.
(Continued)

*Primary Examiner* — Milton I Cano
*Assistant Examiner* — Michael Dignan
(74) *Attorney, Agent, or Firm* — Westerman, Hattori, Daniels & Adrian, LLP

(57) ABSTRACT

A sealing plate for a prismatic secondary battery includes a pair of mouths for attaching a negative and positive electrode terminals, one mouth being formed near one end in a longitudinal direction of the sealing plate, and the other mouth being formed near the other end, coining areas used for positioning of an insulating member and formed around the pair of mouths on a front face of the sealing plate, a gas release valve and an electrolyte pour hole formed between the pair of mouths, and grooves formed between the respective coining areas and the long side edge of the sealing plate. The groove has a smaller depth near the gas release valve than the depth near the coining area. Even when the sealing plate is produced through forging, the front face has good flatness and the coining areas are unlikely to have a sink mark or a shear drop.

18 Claims, 4 Drawing Sheets

(52) U.S. Cl.
CPC .............. *H01M 2/12* (2013.01); *H01M 2/362* (2013.01); *B21K 23/00* (2013.01); *H01M 2220/20* (2013.01)

(56) References Cited

U.S. PATENT DOCUMENTS

| | | | |
|---|---|---|---|
| 3,951,084 A * | 4/1976 | Cookson | B21D 51/38 413/12 |
| 7,479,347 B2 | 1/2009 | Yeo et al. | |
| 7,687,188 B2 | 3/2010 | Marubayashi et al. | |
| 7,781,088 B2 | 8/2010 | Yamauchi et al. | |
| 8,501,346 B2 | 8/2013 | Byun et al. | |
| 8,652,663 B2 | 2/2014 | Baek et al. | |
| 9,017,843 B2 * | 4/2015 | Hattori | H01M 2/0217 429/163 |
| 9,263,719 B2 * | 2/2016 | Hattori | H01M 2/024 |
| 2010/0233529 A1 | 9/2010 | Nansaka et al. | |
| 2012/0070697 A1 | 3/2012 | Baek et al. | |
| 2012/0129019 A1 | 5/2012 | Onnerud et al. | |
| 2012/0183845 A1 * | 7/2012 | Kawamoto | H01M 2/305 429/179 |
| 2013/0029190 A1 * | 1/2013 | Kim | H01M 2/34 429/61 |

OTHER PUBLICATIONS

U.S. Notice of Allowance dated Nov. 19, 2014, issued in corresponding U.S. Appl. No. 13/550,982.

* cited by examiner

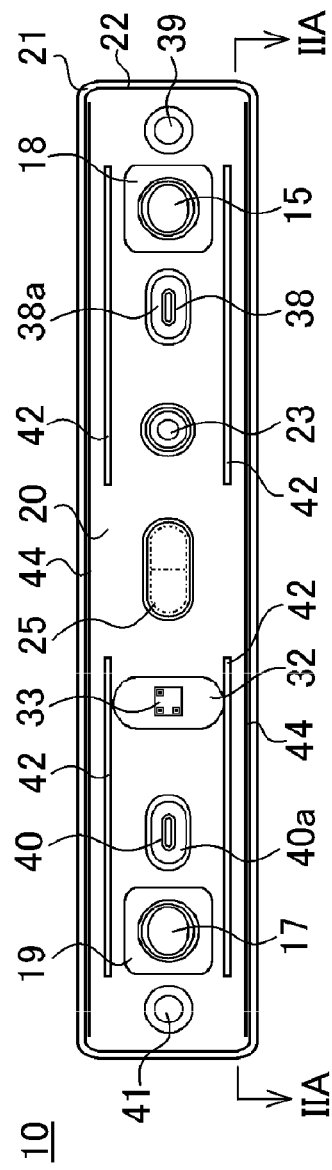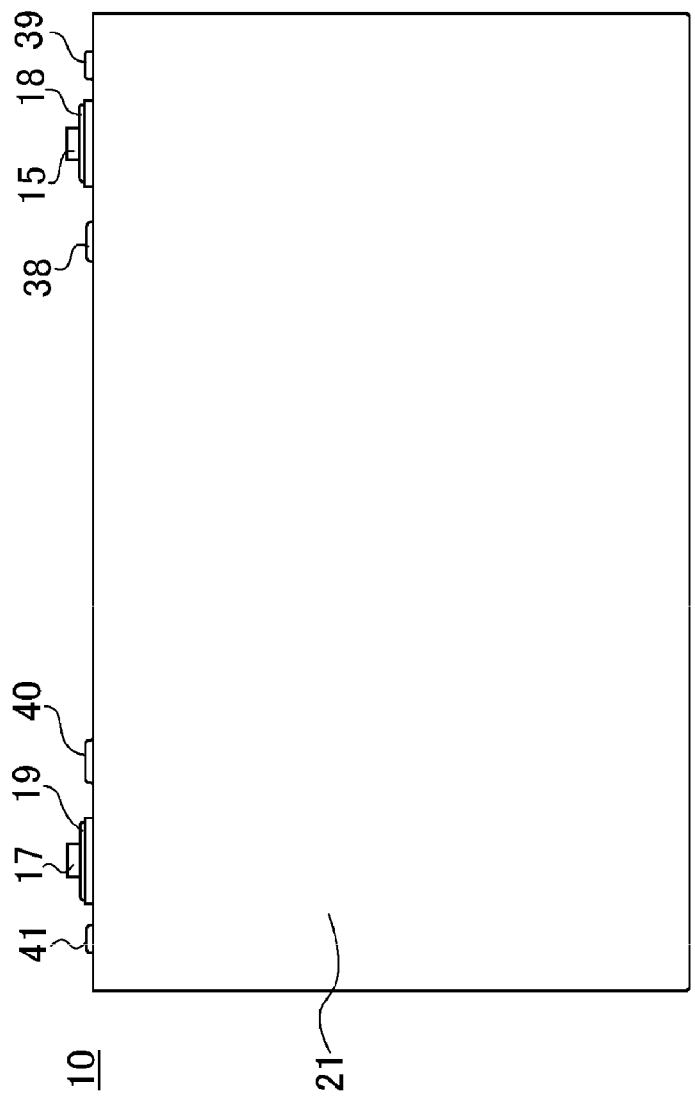
Fig.1B
Fig.1A

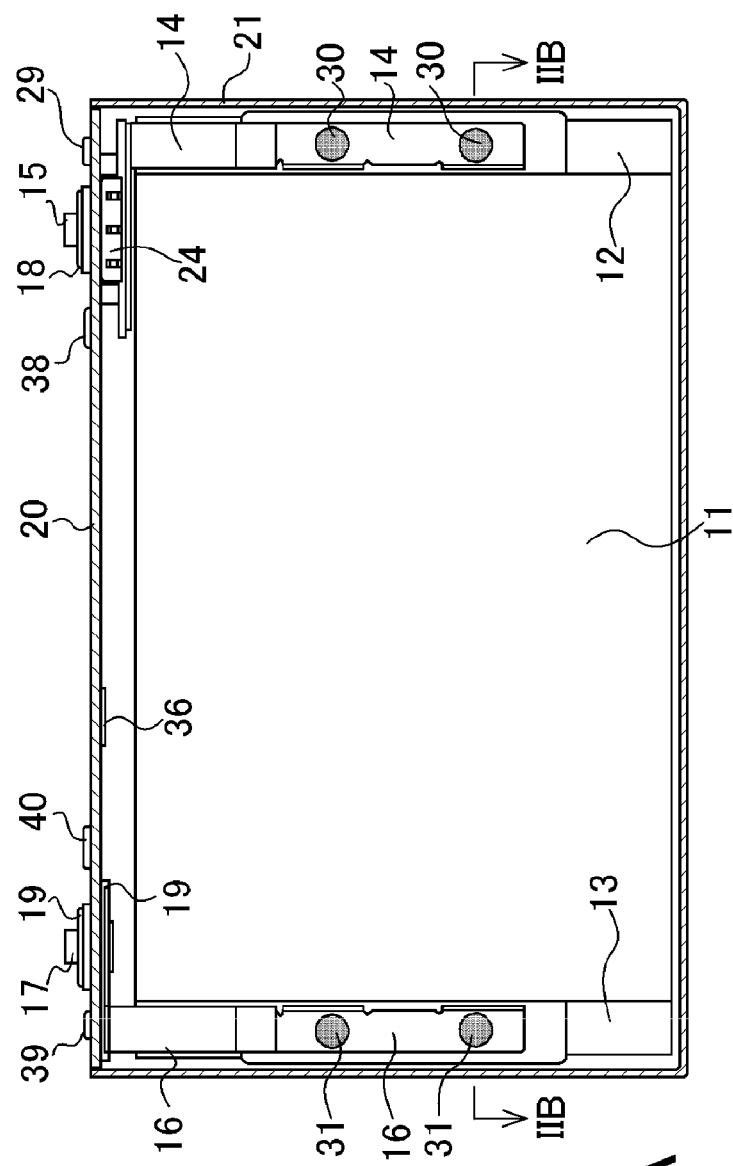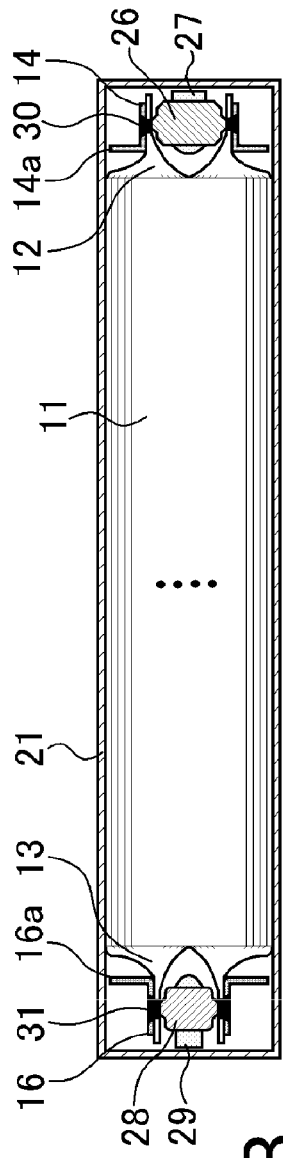
Fig.2A
Fig.2B

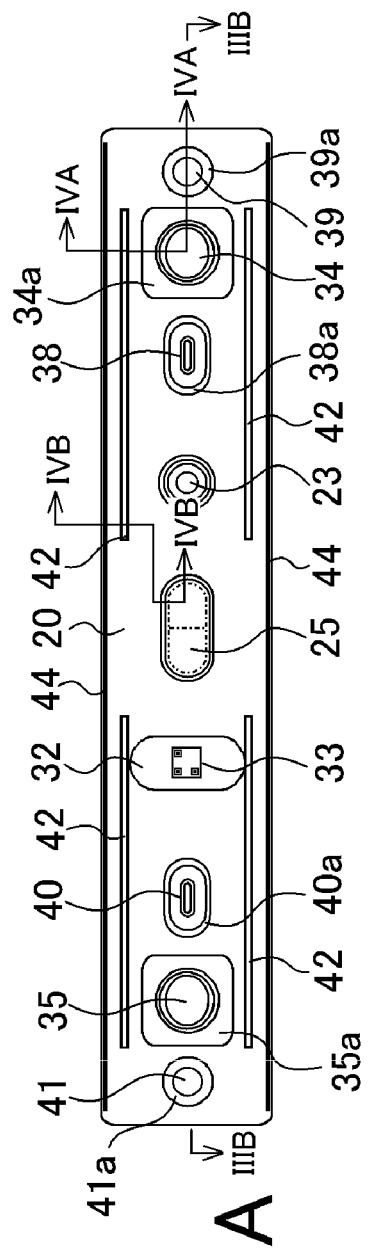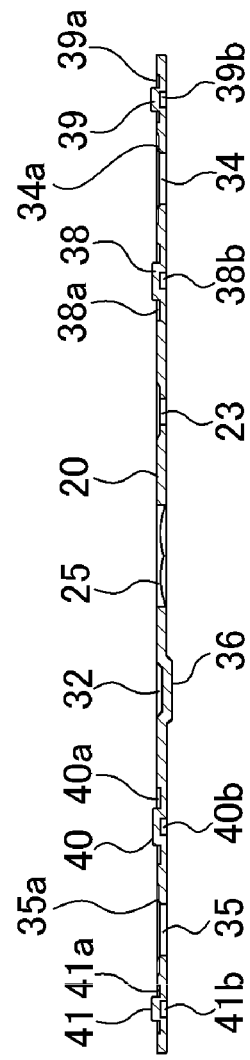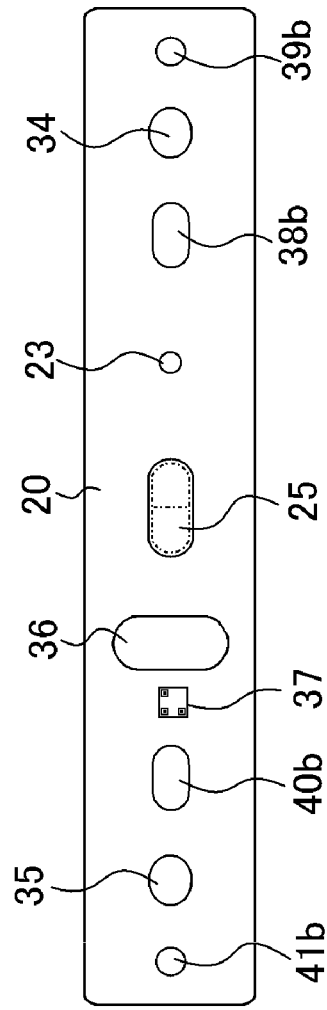

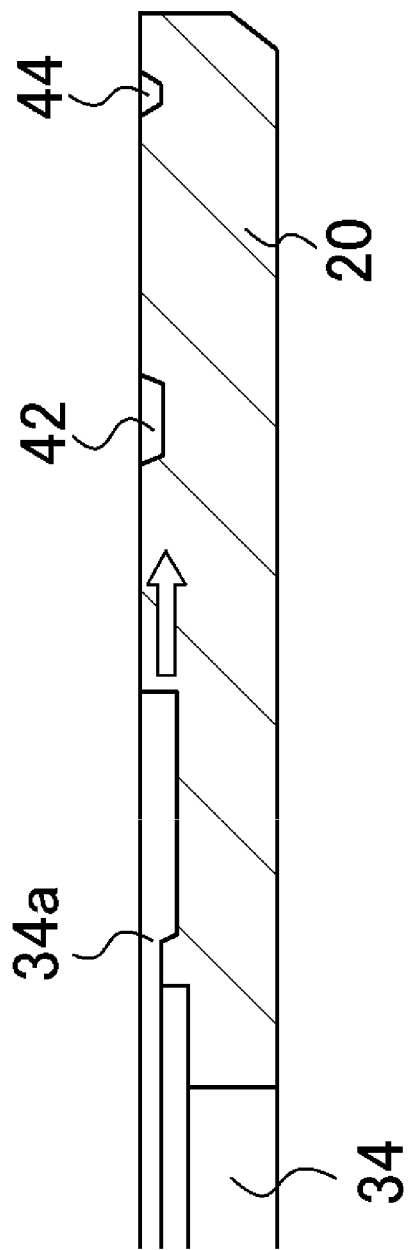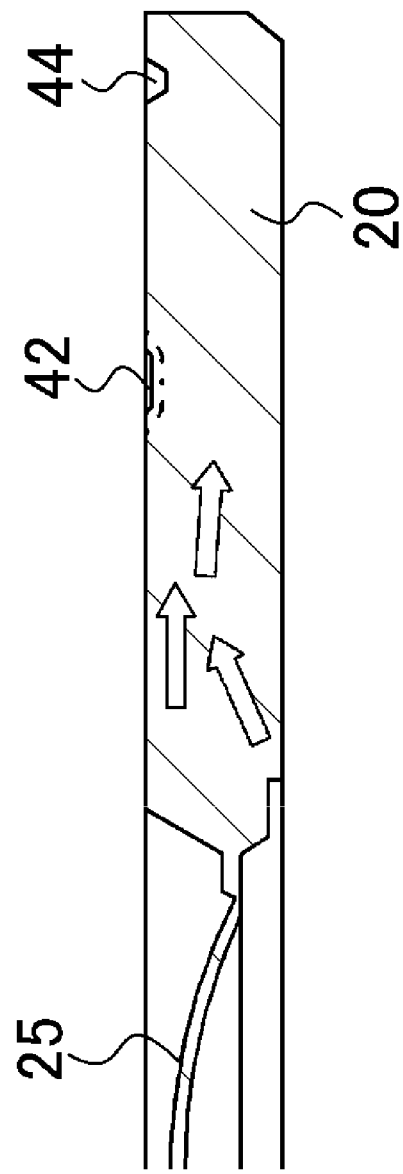

SEALING PLATE FOR PRISMATIC SECONDARY BATTERY, METHOD FOR PRODUCING THE SAME, AND PRISMATIC SECONDARY BATTERY USING THE SAME

This application is a Continuation of U.S. application Ser. No. 13/550,982 filed on Jul. 17, 2012, which issued as U.S. Pat. No. 8,991,232, and which is hereby incorporated by reference.

TECHNICAL FIELD

The present invention relates to a sealing plate for a prismatic secondary battery, a method for producing the same, and a prismatic secondary battery using the same.

BACKGROUND ART

Alkaline secondary batteries typified by a nickel-hydrogen battery and nonaqueous electrolyte secondary batteries typified by a lithium ion battery are widely used as power supplies for driving portable electronic equipment such as cell phones including smartphones, portable computers, PDAs, and portable music players. In addition, alkaline secondary batteries and the nonaqueous electrolyte secondary batteries are also widely used for power supplies for driving electric vehicles (EVs) and hybrid electric vehicles (HEVs, PHEVs) and in stationary storage battery systems for suppressing the variation in output power of photovoltaic generation, wind power generation, and the like, and for peak shifts in system power in order to store electric power during the night time and to use the electric power during daytime.

In particular, the batteries for EVs, HEVs, and PHEVs and for the stationary storage battery system are required to have high capacity and high output characteristics, and hence each battery is upsized and a number of batteries are connected in series or parallel when used. To address this, in these applications, prismatic secondary batteries are generally used from the viewpoint of space efficiency. A prismatic secondary battery that further needs physical strength commonly employs, as an outer body of the battery, a metal prismatic outer body having a mouth and a metal sealing plate for sealing up the mouth.

Such a prismatic secondary battery, for example, a prismatic nonaqueous electrolyte secondary battery, is produced as follows. For example, both faces of a positive electrode substrate made from, for example, a long sheet of aluminum foil, are coated with a positive electrode active material mixture containing a positive electrode active material to prepare a positive electrode sheet. Separately, both faces of a negative electrode substrate made from, for example, a long sheet of copper foil, are coated with a negative electrode active material mixture containing a negative electrode active material to prepare a negative electrode sheet.

Next, the positive electrode sheet and the negative electrode sheet are stacked interposing a separator made from, for example, a microporous polyethylene film therebetween, and the positive electrode sheet and the negative electrode sheet are spirally wound on a cylindrical winding core while insulating the positive electrode sheet and the negative electrode sheet from each other through the separator to prepare a cylindrical wound electrode assembly. Then, the cylindrical wound electrode assembly is pressed with a pressing machine to form a flat wound electrode assembly. Next, a positive electrode collector electrically connected to the positive electrode sheet is electrically connected to a positive electrode terminal that is insulated from a sealing plate, while a negative electrode collector electrically connected to the negative electrode sheet is electrically connected to a negative electrode terminal that is insulated from a sealing plate. Then, the flat wound electrode assembly is wrapped with a member having insulating characteristics and stored in a metal prismatic outer body; a mouth portion of the prismatic outer body is sealed with a sealing plate; an electrolyte is poured from a electrolyte pour hole provided on the sealing plate; and finally the electrolyte pour hole is sealed to produce the prismatic nonaqueous electrolyte secondary battery.

Such a prismatic secondary battery required to have high capacity and high output characteristics is required to have much higher safety than that of secondary batteries for portable small equipment. Especially, in the case of a nonaqueous electrolyte secondary battery that uses a material having very high reactivity, for example, as shown in US Patent Publication No. 2010/0233529 (US2010/0233529 (A1)) and U.S. Pat. No. 7,781,088 specification (U.S. Pat. No. 7,781,088 (B2)), this nonaqueous electrolyte secondary battery is equipped with a gas release valve for releasing internal pressure when the pressure in a battery outer body is increased and a current interruption mechanism for interrupting electrical connection between an external terminal and an electrode assembly in the outer body.

The metal sealing plate used for the prismatic secondary battery includes at least a mouth for attaching a positive electrode terminal, a mouth for attaching a negative electrode terminal, a gas release valve, and an electrolyte pour hole. The metal sealing plate commonly has a rectangular shape, a chamfered rectangular shape, a rounded rectangular shape, or an oval shape. The mouth for attaching a positive electrode terminal and the mouth for attaching a negative electrode terminal are arranged so that one mouth is formed near one end in the longitudinal direction of the sealing plate and the other mouth is formed near the other end, and each of the gas release valve and the electrolyte pour hole is provided between the negative electrode terminal and the positive electrode terminal on the sealing plate.

The gas release valve is required to have a uniform working pressure and thus needs to be machined with a high degree of accuracy. For example, as a material for forming a sealing plate for a prismatic nonaqueous electrolyte secondary battery, an aluminum material having a thickness of 0.5 to several mm is adopted, and such a material is machined so that a thin-wall portion of the gas release valve has a thickness of about 0.01 to 0.03 mm. In such a gas release valve, the variation in the thickness of the thin-wall portion by only 0.001 mm largely changes the working pressure. Therefore, it is important to provide a thin-wall portion having a uniform thickness. In general, the gas release valve is formed as a coining area through forging during the production of a sealing plate of a prismatic secondary battery.

However, the gas release valve has a large area in the sealing plate of a prismatic secondary battery, resulting in increasing the amount of forging. When a peripheral shape is not uniform, the large forging amount may generate a non-uniform metal flow (shock mark) around the forged area to break the flatness of the front face. The broken flatness of the front face around the gas release valve not only tilts members that are disposed on the front face of the sealing plate but also varies the working pressure of the gas release valve.

Furthermore, the sealing plate for a prismatic nonaqueous electrolyte secondary battery includes mouths for attaching a positive electrode terminal and a negative electrode terminal with an insulating member such as a gasket interposed therebetween, one mouth being formed near one end in a longitudinal direction of the sealing plate, and the other mouth being formed near the other end, and coining areas around the mouths. When an aluminum material is machined through forging to form the mouths and the coining-formed areas, the metal flow may not follow the mold punch in the coining-formed areas, resulting in a sink mark or a shear drop. Such a coining area having a large sink mark or a large shear drop around the mouth deteriorates the positioning performance of a gasket inserted into the mouth.

SUMMARY

An advantage of some aspects of the invention is to provide a sealing plate for a prismatic secondary battery having a structure that has good flatness around a gas release valve and in which a sink mark or a shear drop is unlikely to be generated in a coining area around each mouth for attaching a positive electrode terminal and a negative electrode terminal with an insulating member such as a gasket interposed therebetween, a method for producing the sealing plate, and to provide a prismatic secondary battery using the sealing plate.

According to an aspect of the invention, a sealing plate for a prismatic secondary battery includes a pair of mouths for attaching a negative electrode terminal and a positive electrode terminal, one mouth being formed near one end in a longitudinal direction of the sealing plate, and the other mouth being formed near the other end, and a gas release valve and an electrolyte pour hole provided between the pair of mouths. In the sealing plate for a prismatic secondary battery, the sealing plate includes a front face having a coining area around the pair of mouths, the coining area being used for positioning of an insulating member, and the front face includes a groove from a position between the corresponding coining area and a long side edge of the sealing plate to a position near the gas release valve along the long side edge of the sealing plate.

The "front face" of the sealing plate for a prismatic secondary battery of the invention represents a portion positioned on the outer side of the prismatic secondary battery, while a portion of the sealing plate positioned on the inner side of the prismatic secondary battery is expressed as a "back face". The formation of an area having a large amount of forging, such as the gas release valve through forging leads to a non-uniform metal flow because the peripheral shape of the gas release valve is not uniform. In the sealing plate for a prismatic secondary battery of the invention, the nonuniform metal flow around the gas release valve during the formation of the gas release valve is absorbed by the groove formed near the gas release valve. Therefore, with the sealing plate for a prismatic secondary battery of the invention, the sealing plate obtains good front face flatness, predetermined members can be stably attached onto the front face of the sealing plate, and the variation in working pressure of the gas release valve can be suppressed.

Metal flows during the formation of the pair of mouths for attaching a positive electrode terminal and a negative electrode terminal near respective ends of the sealing plate and the coining area on the front face near the mouths can also be suppressed by the concomitant formation of groove between the coining area and the long side edge of the sealing plate. Therefore, the sealing plate for a prismatic secondary battery of the invention is unlikely to generate a sink mark or a shear drop in the coining area and this improves positioning performance of an insulating member when the insulating member is attached to the coining area.

In the sealing plate for a prismatic secondary battery of the invention, it is preferable that the groove have a large depth near the coining area and has a small depth near the exhaust valve.

With the sealing plate for a prismatic secondary battery of the invention, when a forging mold designed so as to afford a groove having a uniform depth is used, the formed groove naturally has a large depth near the coining area and has a small depth near the exhaust valve. Therefore, the sealing plate for a prismatic secondary battery is easily produced.

In the sealing plate for a prismatic secondary battery, it is preferable that the gas release valve be formed at the center between the positive electrode terminal and the negative electrode terminal, the front face of the sealing plate include a concaved flat face on the opposite side to the side having the electrolyte pour hole, and the concaved flat face have a flat face with a height less than that of the surrounding portion.

The "concaved flat face" in the sealing plate for a prismatic secondary battery of the invention may include a so-called "groove" including a flat face that has a height less than that of the surrounding portion and that is formed across the whole width (short side) of the sealing plate, however, preferably does not include the above "groove". On this account, with the sealing plate for a prismatic secondary battery of the invention, the reduction in flexural strength with respect to the longitudinal direction of the sealing plate is small in the concaved flat face. This can suppress the deformation of the sealing plate when the internal pressure of the prismatic secondary battery is increased and can stabilize working pressure of the gas release valve. Moreover, the sealing plate for a prismatic secondary battery of the invention does not generate a level difference in a fitting portion between the sealing plate and the battery outer body, and this enables uniform laser-welding of the fitting portion between the sealing plate and the battery outer body.

In addition, in the sealing plate for a prismatic secondary battery of the invention, the gas release valve is formed at the center between the positive electrode terminal and the negative electrode terminal as well as components reducing flexural strength in the longitudinal direction, such as the electrolyte pour hole and the concaved flat face are symmetrically formed on respective sides of the gas release valve. Hence, the internal pressure of the battery is evenly applied to the gas release valve, and this stabilizes working pressure of the gas release valve. The sealing plate usable in the invention may have, for example, a rectangular shape, a chamfered rectangular shape, a rounded rectangular shape, or an oval shape in a planar view.

In the sealing plate for a prismatic secondary battery of the invention, it is preferable that the concaved flat face have an identification code.

In the sealing plate for a prismatic secondary battery of the invention, the identification code is formed on the opposite side to the electrolyte pour hole through the gas release valve, and this increases the distance between the electrolyte pour hole and the identification code. As a result, with the sealing plate for a prismatic secondary battery of the invention, even when an electrolyte is dispersed while being poured from the electrolyte pour hole into the prismatic outer body, the electrolyte is unlikely to adhere to the identification code, and hence readability of the identification code is unlikely to deteriorate.

In addition, the sealing plate for a prismatic secondary battery of the invention includes the concaved flat face that is formed on the front face of the sealing plate and that has a flat face having a height less than that of the surrounding portion, and includes the identification code formed on the concaved flat face. Hence, even when a jig for assembling the prismatic secondary battery or the like comes into contact with the sealing plate, such a jig is unlikely to come into contact with the identification code part. On this account, with the sealing plate for a prismatic secondary battery of the invention, the identification code is unlikely to be abraded, and therefore the traceability is unlikely to be lost during the assembly process and after the assembly of the prismatic secondary battery.

In the sealing plate for a prismatic secondary battery of the invention, the application method of the identification code may be any known mode, for example, printing, laser marking, and seal-application. Among them, laser marking is preferably adopted because the applied identification code is unlikely to be abraded or peeled and is unlikely to be misread. Examples of usable types of identification code include a well-known code including a simple code such as numbers, characters, and symbols, a one-dimensional code such as a bar-code, and a two-dimensional code such as a stacked bar-code. Among them, the two-dimensional code is desirable because it can contain a large amount of information and is misread less frequently even when the code has been abraded or has peeled away.

In the sealing plate for a prismatic secondary battery, it is preferable that the sealing plate include a back face having a convex portion at a position corresponding to the concaved flat face.

When the concaved flat face is formed by forging, the convex portion can be easily formed on the back face of the sealing plate at a position corresponding to the concaved flat face. In addition, the presence of the concaved portion on the front face and the convex portion on the back face increases the flexural strength of the sealing plate in both the longitudinal direction and the width direction. Hence, such a structure can further suppress the deformation of the sealing plate when the internal pressure of the prismatic secondary battery is increased and can further stabilize working pressure of the gas release valve.

In the sealing plate for a prismatic secondary battery according to the aspect, an additional identification code may be applied on at least one side adjacent to the convex portion in the longitudinal direction of the sealing plate.

In the longitudinal direction of the sealing plate, both sides adjacent to the convex portion are positions at which a jig for assembling the prismatic secondary battery or the like is unlikely to physically come into contact. The back face of the sealing plate is positioned inside of the prismatic secondary battery and is not exposed to the outside after the completion of the prismatic secondary battery. Thus, with the sealing plate for a prismatic secondary battery of the invention, the additional identification code is unlikely to be abraded and hence the traceability is unlikely to be lost, at least during the assembly process of the prismatic secondary battery.

The additional identification code may be the same as or different from the identification code applied onto the concaved flat face. However, the additional identification code is not exposed to the outside after the completion of the prismatic secondary battery and is entirely used to ensure the traceability during an assembly process. Thus, the additional identification code is preferably different from the identification code applied onto the concaved flat face.

In the sealing plate for a prismatic secondary battery according to the aspect, it is desirable that the convex portion be provided at a position adjacent to the gas release valve and that the additional identification code be formed at a position opposite to the gas release valve with respect to the convex portion.

The presence of the convex portion at a position adjacent to the gas release valve further increases the flexural strength of the sealing plate in both the longitudinal direction and the width direction. Hence, such a structure can further suppress the deformation of the sealing plate when the internal pressure of the prismatic secondary battery is increased and can further stabilize working pressure of the gas release valve.

According to another aspect of the invention, a method for producing a sealing plate for a prismatic secondary battery, the sealing plate including a pair of mouths for attaching a negative electrode terminal and a positive electrode terminal, one mouth being formed near one end in a longitudinal direction of the sealing plate, and the other mouth being formed near the other end, and including a gas release valve and an electrolyte pour hole provided between the pair of mouths, includes: (1) simultaneously forming through forging, on a material forming the sealing plate for a prismatic secondary battery, the pair of mouths for attaching a negative electrode terminal and a positive electrode terminal near the respective ends in the longitudinal direction, a coining area used for positioning of an insulating member around each of the pair of mouths, the electrolyte pour hole, and a groove from a position between the corresponding coining area and a long side edge of the sealing plate to near a position to form the gas release valve along the long side edge of the sealing plate; and thereafter (2) forming the gas release valve at the position to form the gas release valve through forging.

By the method for producing a sealing plate for a prismatic secondary battery of the invention, the sealing plate for a prismatic secondary battery of the invention providing the advantages can be easily produced.

In the method for producing a sealing plate for a prismatic secondary battery of the invention, the groove in (1) each may be formed to have a uniform depth across the longitudinal direction. In the method for producing a sealing plate for a prismatic secondary battery of the invention, in (2), the gas release valve may be formed at the center between the positive electrode terminal and the negative electrode terminal and, on a front face of the sealing plate, a concaved flat face with a height less than that of the surrounding portion may be simultaneously formed on the opposite side to the side having the electrolyte pour hole. At the time, an identification code may be formed on the concaved flat face.

In the method for producing a sealing plate for a prismatic secondary battery of the invention, in (2), on a back face of the sealing plate, a convex portion may be simultaneously formed at the position corresponding to the concaved flat face. The method may further include applying an additional identification code onto at least one side adjacent to the convex portion in the longitudinal direction of the sealing plate. The additional identification code may be formed at the position opposite to the gas release valve with respect to the convex portion.

According to another aspect of the invention, a prismatic secondary battery includes: a prismatic hollow outer body having a mouth and a bottom; a flat electrode assembly including a positive electrode sheet and a negative electrode sheet, a positive electrode collector electrically connected to the positive electrode sheet, a negative electrode collector electrically connected to the negative electrode sheet, and an electrolyte, all being stored in the prismatic outer body; a sealing plate sealing up the mouth of the prismatic outer body; and a positive electrode terminal and a negative electrode terminal attached to the sealing plate in a manner electrically insulated from the sealing plate, while electrically connected to the positive electrode collector and the negative electrode collector, respectively. In the prismatic secondary battery, the sealing plate includes a pair of mouths, one mouth being formed near one end in a longitudinal direction of the sealing plate, and the other mouth being formed near the other end, a coining area formed around each mouth on a front face of the sealing plate, a gas release valve and a electrolyte pour hole formed between the pair of mouths, and a groove formed on the front face from a position between the corresponding coining area and a long side edge of the sealing plate to a position near the gas release valve along the long side edge of the sealing plate. Each of the positive electrode terminal and the negative electrode terminal is fixed to the sealing plate through the corresponding mouth and an insulating member attached to the corresponding coining area.

With the prismatic secondary battery of the invention, predetermined members are stably attached to the front face of the sealing plate, the variation in working pressure of the gas release valve can be suppressed, an insulating member is easily positioned to be attached to the coining area, and the positive electrode terminal and the negative electrode terminal are stably attached. As a result, a high quality prismatic secondary battery can be obtained.

In the prismatic secondary battery of the invention, it is preferable that the groove have a large depth near the coining area and have a small depth near the exhaust valve. In the prismatic secondary battery of the invention, the gas release valve may be formed at the center between the positive electrode terminal and the negative electrode terminal, the front face of the sealing plate may include a concaved flat face on the opposite side to the side having the electrolyte pour hole, and the concaved flat face may have a flat face with a height less than that of the surrounding portion. In this case, the flat face of the concave portion may have an identification code.

BRIEF DESCRIPTION OF THE DRAWINGS

The invention will be described with reference to the accompanying drawings, wherein like numbers reference like elements.

FIG. 1A is an elevation view of a prismatic nonaqueous electrolyte secondary battery of an embodiment and FIG. 1B is a plan view of the prismatic nonaqueous electrolyte secondary battery.

FIG. 2A is a partial cross-sectional view taken along the line IIA-IIA in FIG. 1B and FIG. 2B is a partial cross-sectional view taken along the line IIB-IIB in FIG. 2A.

FIG. 3A is a plan view of a sealing plate of an embodiment, FIG. 3B is a cross-sectional view taken along the line IIIB-IIIB in FIG. 3A, and FIG. 3C is a bottom view of the sealing plate of the embodiment.

FIG. 4A is a cross-sectional view taken along the line IVA-IVA in FIG. 3A and FIG. 4B is a cross-sectional view taken along the line IVB-IVB in FIG. 3A.

DESCRIPTION OF EXEMPLARY EMBODIMENT

Hereinafter, embodiment of the invention will be described in detail with reference to the accompanying drawings. However, the embodiment described below is intended to exemplify the technical spirit of the invention, the invention is not intended to be limited to the embodiment, and the invention may equally be applied to various modified cases without departing from the technical spirit described in the claims. In each drawing used for explanation in the specification, each member is appropriately shown on a different scale so that the member has a recognizable size in each drawing and the members are not necessarily shown in proportion to the actual sizes.

Embodiment

Firstly, as an example of a prismatic secondary battery of the embodiment, a prismatic nonaqueous electrolyte secondary battery will be described with reference to FIG. 1 and FIG. 2. FIG. 1A is a front view of the prismatic nonaqueous electrolyte secondary battery, and FIG. 1B is a plan view of the prismatic nonaqueous electrolyte secondary battery. FIG. 2A is a cross-sectional view taken along the line IIA-IIA in FIG. 1B, and FIG. 2B is a cross-sectional view taken along the line IIB-IIB in FIG. 2A.

A prismatic nonaqueous electrolyte secondary battery 10 includes a flat wound electrode assembly 11 in which a positive electrode sheet and a negative electrode sheet are wound while being insulated from each other through a separator, which are not shown in the drawings. The positive electrode sheet is prepared by coating both faces of a positive electrode substrate made from aluminum foil with a positive electrode active material mixture, then drying and rolling the coated substrate, and slitting the substrate so as to expose the aluminum foil in a strip shape. Separately, the negative electrode sheet is prepared by coating both faces of a negative electrode substrate made from copper foil with a negative electrode active material mixture, then drying and rolling the coated substrate, and slitting the substrate so as to expose the copper foil in a strip shape.

Then, the flat wound electrode assembly 11 is prepared as follows. The positive electrode sheet and the negative electrode sheet obtained as above are stacked interposing a polyolefin microporous separator therebetween so as to displace the aluminum foil exposed portion of the positive electrode sheet and the copper foil exposed portion of the negative electrode sheet from the corresponding counter electrode active material mixtures, and the whole is wound while insulating the positive electrode sheet and the negative electrode sheet from each other through the separator to afford the flat wound electrode assembly 11 including one end with a plurality of stacked positive electrode substrate exposed portions 12 and the other end with a plurality of stacked negative electrode substrate exposed portions 13.

The plurality of stacked positive electrode substrate exposed portions 12 are electrically connected through a positive electrode collector 14 made of aluminum to a positive electrode terminal 15 also made of aluminum, and similarly, the plurality of stacked negative electrode substrate exposed portions 13 are electrically connected through a negative electrode collector 16 made of copper to a negative electrode terminal 17 also made of copper. The positive electrode terminal 15 and the negative electrode terminal 17 are, as shown in FIG. 2A and FIG. 2B, fixed to a sealing plate 20 made of, for example, aluminum through an insulating members 18 and 19, respectively. The positive electrode terminal 15 and the negative electrode terminal 17 are, as necessary, connected to an external positive electrode terminal and an external negative electrode terminal (not shown in the drawings) arranged on the insulating members 18 and 19, respectively.

The flat wound electrode assembly 11 prepared as above is wrapped with a resin sheet (not shown in the drawings) having insulating characteristics except the sealing plate 20 side and is inserted into a prismatic outer body 21 made of, for example, aluminum having an open face. Then, the sealing plate 20 is fitted to the mouth portion of the prismatic outer body 21; a fitting portion 22 between the sealing plate 20 and the outer body 21 is laser-welded; then, a nonaqueous electrolyte is poured from an electrolyte pour hole 23; and the electrolyte pour hole 23 is sealed up to produce the prismatic nonaqueous electrolyte secondary battery 10 of the embodiment.

A current interruption mechanism 24 that works correspondingly to the pressure of gas generated in the battery is provided between the positive electrode collector 14 and the positive electrode terminal 15. The sealing plate 20 also equips a gas release valve 25 that opens when the gas pressure becomes higher than the working pressure of the current interruption mechanism 24. Thus, the inside of the prismatic nonaqueous electrolyte secondary battery 10 is hermetically sealed. The prismatic nonaqueous electrolyte secondary battery 10 is used alone or used with a plurality of the batteries connected in series or parallel, for various applications. When a plurality of the prismatic nonaqueous electrolyte secondary batteries 10 are connected in series or parallel to be used, an external positive electrode terminal and an external negative electrode terminal are preferably provided separately for connecting each battery through bus bars so as to send a large current.

In the flat wound electrode assembly 11, as shown in FIG. 2A and FIG. 2B, on the positive electrode sheet side, the plurality of stacked positive electrode substrate exposed portions 12 are divided into two portions, and between the portions, a positive electrode intermediate member 27 made of resin and having a plurality of positive electrode connection conductive members 26, two positive electrode connection conductive members 26 in the embodiment, is interposed. In a similar manner, on the negative electrode sheet side, the plurality of stacked negative electrode substrate exposed portions 13 are divided into two portions, and between the portions, a negative electrode intermediate member 29 made of resin and having two negative electrode connection conductive members 28 is interposed. On the outermost surface of the positive electrode substrate exposed portions 12 positioned on each side of the positive electrode connection conductive member 26, a positive electrode collector 14 is disposed, and on the outermost surface of the negative electrode substrate exposed portions 13 positioned on each side of the negative electrode connection conductive member 28, a negative electrode collector 16 is disposed. The positive electrode connection conductive member 26 is made of aluminum that is the same material as the positive electrode substrate, the negative electrode connection conductive member 28 is made of copper that is the same material as the negative electrode substrate, and the shape of the positive electrode connection conductive member 26 may be the same as or different from that of the negative electrode connection conductive member 28.

The positive electrode collector 14 is resistance-welded to the positive electrode substrate exposed portion 12 (at four points), and the positive electrode substrate exposed portion 12 is resistance-welded to the positive electrode connection conductive member 26 (at four points), for connection. Similarly, the negative electrode collector 16 is resistance-welded to the negative electrode substrate exposed portion 13 (at four points), and the negative electrode substrate exposed portion 13 is resistance-welded to the negative electrode connection conductive member 28 (at four points), for connection. FIG. 2A shows, on the positive electrode side, two weld marks 30 formed by the resistance welding and, on the negative electrode side, two weld marks 31.

Hereinafter, in the flat wound electrode assembly 11 of the Embodiment, the resistance welding method using the positive electrode substrate exposed portions 12, the positive electrode collector 14, and the positive electrode intermediate member 27 having the positive electrode connection conductive members 26 and the resistance welding method using the negative electrode substrate exposed portions 13, the negative electrode collector 16, and the negative electrode intermediate member 29 having the negative electrode connection conductive members 28 will be described in detail. However, in the Embodiment, the shapes of the positive electrode connection conductive member 26 and the positive electrode intermediate member 27 may be substantially the same as the shapes of the negative electrode connection conductive member 28 and the negative electrode intermediate member 29, and each resistance welding method may be substantially the same. Therefore, the method for the positive electrode sheet side will be described below as a typical example.

First, the positive electrode substrate exposed portions 12 of the flat wound electrode assembly 11 prepared as above were divided from the wound center to both side into two portions, and the divided positive electrode substrate exposed portions 12 were gathered to a center as a quarter of the thickness of the electrode assembly. Then, the positive electrode collectors 14 were disposed on both sides of the outermost periphery of the positive electrode substrate exposed portions 12, the positive electrode intermediate member 27 having the positive electrode connection conductive members 26 was inserted between both sides of the bisectional positive electrode substrate exposed portions 12 so that protrusions on both sides of the positive electrode connection conductive member 26 were in contact with the positive electrode substrate exposed portions 12 on the inner periphery thereof. The positive electrode collector 14 is made from, for example, an aluminum plate having a thickness of 0.8 mm.

Here, the positive electrode connection conductive member 26 held with the positive electrode intermediate member 27 in the Embodiment has a column-shaped body with two opposed faces, and a protrusion (projection) having, for example, a truncated cone shape is formed on each face. The positive electrode connection conductive member 26 may have any shape, for example, a prismatic shape and an elliptical column shape, in addition to the cylindrical shape, as long as it is a metal block. Examples of the material usable for forming the positive electrode connection conductive member 26 include copper, a copper alloy, aluminum, an aluminum alloy, tungsten, and molybdenum. In addition to the members made of these metals, for example, a member having a protrusion coated with nickel or a member in which the material of a protrusion and the vicinity of a bottom of the protrusion are changed into a metal capable of accelerating heat generation, such as tungsten and molybdenum and such a protrusion is bonded to the cylindrical-shaped body of the positive electrode connection conductive member 26 made of copper, a copper alloy, aluminum, or an aluminum alloy by brazing or the like may be used.

A plurality of the positive electrode connection conductive members 26 of the Embodiment, for example, two positive electrode connection conductive members are integrally held with the positive electrode intermediate member 27 made of a resin material. In this case, the positive electrode connection conductive members 26 are held so as to be parallel to each other. The positive electrode intermediate member 27 may have any shape, for example, a prismatic shape and a column shape. However, the shape is preferably a prismatic shape having a long lateral length in order to be fixed between the bisectional positive electrode substrate exposed portions 12 while being stably positioned. However, corners of the positive electrode intermediate member 27 are preferably chamfered so as not to scratch or deform the soft positive electrode substrate exposed portion 12 even when the corner comes into contact with the positive electrode substrate exposed portion 12. At least a part to be inserted between the bisectional positive electrode substrate exposed portions 12 may be chamfered.

The length of the prismatic positive electrode intermediate member 27 varies depending on the size of the prismatic nonaqueous electrolyte secondary battery 10, but may be 20 mm to several tens of mm. The width of the prismatic positive electrode intermediate member 27 may be substantially the same as the height of the positive electrode connection conductive member 26, but the prismatic positive electrode intermediate member 27 may have a width of which at least both ends of the positive electrode connection conductive member 26 to be welded are exposed. Both ends of the positive electrode connection conductive member 26 preferably protrude from the surface of the positive electrode intermediate member 27, but may not necessarily protrude. With such a structure, the positive electrode connection conductive member 26 is held with the positive electrode intermediate member 27 and the positive electrode intermediate member 27 is disposed between the bisectional positive electrode substrate exposed portions 12 while being stably positioned.

Next, between a pair of resistance welding electrode rods (not shown in the drawings), the positive electrode collector 14 and the flat wound electrode assembly 11 with the positive electrode intermediate member 27 holding the positive electrode connection conductive members 26 are disposed. The pair of the resistance welding electrode rods are brought into contact with the positive electrode collectors 14 disposed on both outermost periphery sides of the positive electrode substrate exposed portions 12. Then, an appropriate pressure is applied between the pair of the resistance welding electrode rods to perform resistance welding in a previously determined constant condition. During the resistance welding, the positive electrode intermediate member 27 is disposed while being stably positioned between the bisectional positive electrode substrate exposed portions 14. This improves the dimensional precision between the positive electrode connection conductive member 26 and the pair of electrode rods, enables the resistance welding in an exact and stable condition, and can suppress variation in the welding strength.

Next, the specific structure and the specific production method of the sealing plate of the invention will be described with reference to FIGS. 3 and 4. FIG. 3A is a plan view of a sealing plate of the embodiment, FIG. 3B is a cross-sectional view taken along the line IIIB-IIIB in FIG. 3A, and FIG. 3C is a bottom view of the sealing plate of the embodiment. FIG. 4A is a cross-sectional view taken along the line IVA-IVA in FIG. 3A and FIG. 4B is a cross-sectional view taken along the line IVB-IVB in FIG. 3A.

The sealing plate 20 has, for example, a rectangular shape, includes a mouth 34 for attaching the positive electrode terminal 15 and a mouth 35 for attaching the negative electrode terminal 17 on each end side, and includes an electrolyte pour hole 23, a gas release valve 25, and a concaved flat face 32 between the mouths 34 and 35. The concaved flat face 32 has a flat face having a height less than that of the surrounding portion in the sealing plate 20 and being partially formed in a width direction (short side direction) of the sealing plate 20. When the concaved flat face 32 is formed across the whole width of the sealing plate 20, it becomes a so-called "groove." Such a groove largely reduces the flexural strength of the sealing plate 20 in the longitudinal direction as well as generates a level difference between the sealing plate 20 and the end face of the outer body 21, resulting in interfering with uniform laser-welding. In the embodiment, the gas release valve 25 is formed at the center between the mouth 34 for attaching a positive electrode terminal 15 and the mouth 35 for attaching a negative electrode terminal 17, and the electrolyte pour hole 23 and the concaved flat face 32 are formed on respective sides of the gas release valve 25.

The sealing plate 20 of the embodiment further includes anti-rotation protrusions 38 and 40 and auxiliary protrusions 39 and 41 on both sides of the mouth 34 for the positive electrode and the mouth 35 for the negative electrode, respectively, in order to attach the external positive electrode terminal and the external negative electrode terminal (not shown in the drawings) used when a plurality of the prismatic nonaqueous electrolyte secondary batteries are connected in series or parallel. The anti-rotation protrusions 38 and 40 and the auxiliary protrusions 39 and 41 are fitted to the external positive electrode terminal and the electrode negative external terminal that are provided as necessary, and function so that the external positive electrode terminal and the external negative electrode terminal are unlikely to rotate.

In the sealing plate 20, concaves 38a, 40a, 39a, and 41a formed on the front face around the anti-rotation protrusions 38 and 40 and the auxiliary protrusions 39 and 41 as well as concaves 38b, 40b, 39b, and 41b formed in the back face are formed by forging so that each of the anti-rotation protrusions 38 and 40 and the auxiliary protrusions 39 and 41 has a height larger than that of the front face of the sealing plate 20. A convex portion 36 is formed on the back face of the sealing plate 20 corresponding to the concaved flat face 32 formed position.

The front face of the sealing plate 20 further has a coining area 34a around the mouth 34 for attaching the positive electrode terminal 15 and a coining area 35a around the mouth 35 for attaching the negative electrode terminal 17 in order to be used for positioning of the insulating members 18 and 19 (see FIG. 1 and FIG. 2A), respectively. The front face of the sealing plate 20 further has four grooves 42 from a position between the respective coining areas 34a and 35a and the respective long side edges of the sealing plate 20 to a position near the gas release valve 25 along the long side edge of the sealing plate 20.

Here, the specific structures and the specific formation methods of these coining areas 34a and 35a and four grooves 42 will be described in detail. For the sealing plate 20 of the embodiment, firstly, a rectangular aluminum plate is punched out to form the mouths 34 and 35 and the electrolyte pour hole 23 through forging, and, on the front face of the sealing plate 20, the coining areas 34a and 35a around the mouths 34 and 35, the concaved flat face 32, the anti-rotation protrusions 38 and 40, the auxiliary protrusions 39 and 41, and four grooves 42 are formed at the same time. Four grooves 42 each are formed from a position between the respective coining areas 34a and 35a and the respective long side edges of the sealing plate 20 to near a position at which the gas release valve is to form along the long side edge of the sealing plate 20. At this time, the gas release valve 25 is not formed. Four grooves 42 are formed so as to have a uniform depth across the longitudinal direction. The convex portion 36 corresponding to the concave portion 32 is formed on the back face of the sealing plate 20, corresponding to the concaved flat face 32 formed position.

The advantageous effect of the formation of these four grooves 42 will be described with reference to FIG. 4. The coining area 34a around the mouth for attaching the positive electrode terminal 15 has the same structure as that of the coining area 35a for the negative electrode terminal. Thus, in FIG. 4A, the advantageous effect will be described using the coining area 34 for the positive electrode terminal.

When the coining area 34a is formed on the front face around the mouth 34 for the positive electrode terminal through forging, a relief is formed in the metal from the portion for the coining area 34a as shown by the hollow arrow in FIG. 4A because the coining area 34a is a large area. When no countermeasure is taken against the relief, the shape of the coining area 34 may not follow a mold punch and this may generate a sink mark or a shear drop in the coining area 34a. On the other hand, when the groove 42 is simultaneously formed near the coining area 34a, the groove 42 suppresses the relief formed in the coining area 34a. Hence, a sink mark or a shear drop is unlikely to be generated in the coining area 34a and this improves the positioning performance of the insulating member 18 to be attached onto the coining area 34a.

Meanwhile, the gas release valve 25 is formed through forging using an aluminum material having a thickness of 0.5 to several mm so that a thin-wall portion has a thickness of about 0.01 to 0.03 mm. Thus, the amount of moving metal is large and the metal flow arises around the gas release valve 25 as shown by the hollow arrows in FIG. 4A. However, during the forging, the width between both sides of the gas release valve 25 in the width direction is restricted by a mold (not shown in the drawings). Thus, a large amount of the metal moves in the longitudinal direction of the sealing plate 20. When no countermeasure is taken against the metal moving, the flatness of the front face of the sealing plate 20 is broken. In the embodiment, the mouths 34 and 35 and the electrolyte pour hole 23 are formed by punching in advance and, on the front face of the sealing plate 20, the coining areas 34a and 35a around the mouths 34 and 35, the concaved flat face 32, the anti-rotation protrusions 38 and 40, the auxiliary protrusions 39 and 41, and four grooves 42 are formed at the same time, all through forging. After that, the gas release valve 25 is formed through additional forging. Here, in FIG. 4B, the dotted line shows the groove 42 before the formation of the gas release valve 25 and the solid line shows the groove 42 after the formation of the gas release valve 25.

When the gas release valve 25 is formed in such an order, the metal flow during the formation of the gas release valve 25 is absorbed in the groove 42, the amount of the metal flow to the other areas is reduced, and this improves the flatness on the front face of the sealing plate 20. As a result, even when the groove 42 is formed to have a uniform depth across the whole length, the groove 42 has a small depth near the gas release valve 25 and has a large depth near the coining area 34 or 35 after the formation of the gas release valve 25. That is, the groove 42 works to suppress a sink mark or a shear drop of the coining areas 34a and 35a during forging and to relieve forging load of the gas release valve 25. A small groove 44 on the right side in each of FIG. 4A and FIG. 4B is optionally formed so that a welding area of the sealing plate 20 has the same width to that of the outer body 21 in order to perform uniform laser-welding of the fitting portion 22 between the long side edge of the sealing plate 20 and the outer body 21.

In the sealing plate 20 of the embodiment, on the back face of the sealing plate 20 corresponding to the concaved flat face 32 formed position, the convex portion 36 is formed. The adoption of such a structure increases the flexural strength of the sealing plate 20 in both the longitudinal direction and the width direction in comparison with the case without the convex portion 36. Therefore, a prismatic nonaqueous electrolyte secondary battery 10 produced using the sealing plate 20 suppresses the deformation of the sealing plate 20 when the internal pressure is increased, and this can stabilize working pressure of the gas release valve 25.

In the sealing plate 20 of the embodiment, a two-dimensional code as a first identification code 33 is formed on the flat face as the bottom of the concaved flat face 32 on the front face by, for example, laser marking, while, a second identification code 37 is similarly formed by laser marking on a surface of a side adjacent to the convex portion 36 on the back face.

The first identification code 33 is formed on the bottom flat face of the concaved flat face having a height less than that of the surrounding portion that is formed on the front face of the sealing plate 20. Thus, even when a jig for assembling the prismatic nonaqueous electrolyte secondary battery 10 or the like comes into contact with the sealing plate 20, such a jig is unlikely to physically come into contact with the first identification code 33. Therefore, the first identification code 33 is unlikely to be abraded, and the traceability is unlikely to be lost during the assembly process and after the assembly of the prismatic nonaqueous electrolyte secondary battery 10. The second identification code 36 is not exposed to the outside after the assembly of the prismatic nonaqueous electrolyte secondary battery 10, but is used for tracing the assembly process of the prismatic nonaqueous electrolyte secondary battery 10. The first identification code 33 may be the same as or different from the second identification code 36.

Here, the laser marking is exemplified for explaining the application of the first identification code 33 and the second identification code 36, but well-known printing or seal-affixing may be adopted. However, the laser marking is preferably adopted because an applied code is unlikely to be abraded or peeled and is unlikely to be misread. Examples of the usable identification code includes, in addition to the two-dimensional code, a simple code such as numbers, characters, and symbols, a one-dimensional code such as a bar-code. Among them, the two-dimensional code is desirable because it can contain a large amount of information and is misread less frequently even when the code has been abraded or peeled away.

As the sealing plate 20 of the embodiment, the exemplified sealing plate has the convex portion 36 on the back face corresponding to the concaved flat face 32 that is formed on the front face, but the convex portion 36 is not a necessary component. For example, when the concaved flat face 32 is formed on the front face by cutting work, the convex portion is not formed. However, a sealing plate without such a convex portion does not have the advantage of abrasion resistance or peel resistance with respect to the identification code formed on the back face as well as having a smaller flexural strength in the longitudinal direction of the sealing plate 20. To address this, the convex portion 36 is preferably formed on the back face corresponding to the concaved flat face 32 that is formed on the front face as in the case of the sealing plate of the embodiment.

The embodiment describes the prismatic nonaqueous electrolyte secondary battery as an example of the prismatic secondary battery. However, the invention is also applicable to a prismatic secondary battery using an aqueous electrolyte, such as a nickel-hydrogen secondary battery.

What is claimed is:

1. A prismatic secondary battery comprising:
   a prismatic hollow outer body having a mouth and a bottom;
   a flat electrode assembly including a positive electrode sheet and a negative electrode sheet;
   a positive electrode collector electrically connected to the positive electrode sheet;
   a negative electrode collector electrically connected to the negative electrode sheet;
   an electrolyte;
   a positive electrode terminal electrically connected to the positive electrode collector;
   a negative electrode terminal electrically connected to the negative electrode collector;
   a sealing plate sealing up the mouth of the prismatic outer body,
   the sealing plate including
      a front face;
      a back face; and
      a pair of mouths comprising:
         a first mouth formed near one end in a longitudinal direction of the sealing plate, and
         a second mouth formed near the other end in the longitudinal direction of the sealing plate;
   a first coining area formed around the first mouth on the front face;
   a gas release valve and an electrolyte pour hole formed between the pair of mouths;
   a first long side edge;
   a first groove formed on the front face from a position between the first coining area and the first long side edge to a position near the gas release valve along the first long side edge of the sealing plate;
   a second groove formed on the front face,
   the second groove is formed between the second long side edge and the first coining area;
   a first insulating member attached to the first coining area,
   wherein one of the positive electrode terminal and the negative terminal electrode terminal is inserted into the first mouth;
   a region of the sealing plate where the first groove is formed has a thickness thinner than that of a region of the sealing plate which is located around the first groove,
   a region of the sealing plate where the second groove is formed has a thickness thinner than that of a region of the sealing plate which is located around the second groove,
   a length of the first groove in the longitudinal direction of the sealing plate is greater than a length of the first coining area in the longitudinal direction of the sealing plate;
   an end of the first groove which is located near to the gas release valve is arranged between the gas release valve and the electrolyte pour hole in the longitudinal direction of the sealing plate; and
   the first groove has a depth near the gas release valve smaller than a depth of a part of the first groove which is located between the first long side edge and the first coining area,
   an end of the second groove which is located near to the gas release valve is arranged between the gas release valve and the electrolyte pour hole in the longitudinal direction of the sealing plate,
   and the second groove has a depth near the gas release valve smaller than a depth of a part of the second groove which is located between the first long side edge and the first coining area.

2. The prismatic secondary battery according to claim 1 further comprising a second insulating member,
   wherein:
      the sealing plate further includes a second coining area formed around the second mouth on the front face,
      the other of the positive electrode terminal and the negative electrode terminal is inserted into the second mouth,
      the second insulating member is attached to the second coining area,
      the first insulating member is disposed between the one of the positive electrode terminal and the negative electrode terminal and the sealing plate, and
      the second insulating member is disposed between the other of the positive electrode terminal and the negative electrode terminal and the sealing plate.

3. The prismatic secondary battery according to claim 1, wherein:
   the gas release valve is formed at the center between the pair of mouths, and
   a concaved flat face having a flat face with a height less than that of the surrounding portion is formed on a side opposite to a side having the electrolyte pour hole.

4. The prismatic secondary battery according to claim 1, wherein:
   the front face of sealing plate is positioned on an outer side of the prismatic secondary battery, and
   the back face of the sealing plate is positioned on an inner side of the prismatic secondary battery.

5. The prismatic secondary battery according to claim 1, wherein:
   the first groove has a linear shape,
   the sealing plate further includes
   a second groove, and
   a second long side edge;
   the first long side edge and second long side edge are parallel;
   the first groove and the second groove stand apart from each other in a perpendicular direction to the first long side edge;
   the first groove is formed between the first long side edge and the first coining area; and
   the second groove is formed between the second long side edge and the first coining area.

6. The prismatic secondary battery according to claim 5, wherein the first groove and the second groove are formed in parallel.

7. The prismatic secondary battery according to claim 1, wherein:
   the electrolyte pour hole is circular when viewed from a perpendicular direction to the longitudinal direction of the sealing plate, and
   a width of the first groove in a direction in which a short-side portion of the sealing plate extends is shorter than an inner diameter of the electrolyte pour hole.

8. The prismatic secondary battery according to claim 1, wherein:
the sealing plate further includes
a second groove,
a third groove,
a fourth groove, and
a second long side edge;
the first long side edge and second long side edge are parallel;
the first groove and the second groove stand apart from each other in a perpendicular direction to the first long side edge;
the third groove and the fourth groove stand apart from each other in a perpendicular direction to the first long side edge;
the first groove and the third groove stand apart from each other in a parallel direction to the first long side edge;
the second groove and the fourth groove stand apart from each other in a parallel direction to the first long side edge;
the first groove is formed between the first long side edge and the first coining area;
the second groove is formed between the second long side edge and the first coining area;
the third groove is formed between the first long side edge and the second coining area;
the fourth groove is formed between the second long side edge and the second coining area;
wherein the third groove and the fourth groove are formed in parallel.

9. The prismatic secondary battery according to claim 1, wherein:
the positive electrode terminal is insulated from the sealing plate, and
the negative electrode terminal is insulated from the sealing plate.

10. A prismatic secondary battery comprising:
a prismatic hollow outer body having a mouth and a bottom;
a flat electrode assembly including a positive electrode sheet and a negative electrode sheet;
a positive electrode collector electrically connected to the positive electrode sheet;
a negative electrode collector electrically connected to the negative electrode sheet:
an electrolyte;
a positive electrode terminal electrically connected to the positive electrode collector;
a negative electrode terminal electrically connected to the negative electrode collector;
a sealing plate sealing up the mouth of the prismatic outer body,
the sealing plate including
a front face;
a back face; and
a pair of mouths comprising:
a first mouth formed near one end in a longitudinal direction of the sealing plate, and
a second mouth formed near the other end in the longitudinal direction of the sealing plate;
a first coining area formed around the first mouth on the front face;
a second coining area formed around the second mouth on the front face;
a gas release valve and an electrolyte pour hole formed between the pair of mouths; and
a first groove formed on the front face;
a second groove formed on the front face;
a first long side edge; and
a second long side edge,
wherein
the first long side edge and second long side edge are parallel,
the first groove and the second groove stand apart from each other in a perpendicular direction to the first long side edge,
the first groove is formed between the first long side edge and the first coining area,
the second groove is formed between the second long side edge and the first coining area,
a region of the sealing plate where the first groove is formed has a thickness thinner than that of a region of the sealing plate which is located around the first groove,
a region of the sealing plate where the second groove is formed has a thickness thinner than that of a region of the sealing plate which is located around the second groove,
a length of the first groove in the longitudinal direction of the sealing plate is greater than a length of the first coining area in the longitudinal direction of the sealing plate,
a length of the second groove in the longitudinal direction of the sealing plate is greater than a length of the first coining area in the longitudinal direction of the sealing plate;
an end of the first groove which is located near to the gas release valve is arranged between the gas release valve and the electrolyte pour hole in the longitudinal direction of the sealing plate; and
the first groove has a depth near the gas release valve smaller than a depth of a part of the first groove which is located between the first long side edge and the first coining area,
an end of the second groove which is located near to the gas release valve is arranged between the gas release valve and the electrolyte pour hole in the longitudinal direction of the sealing plate,
and the second groove has a depth near the gas release valve smaller than a depth of a part of the second groove which is located between the first long side edge and the first coining area.

11. The prismatic secondary battery according to claim 10 further comprising a first insulating member attached to the first coining area,
wherein:
one of the positive electrode terminal and the negative electrode terminal is inserted into the first mouth, and
the other of the positive electrode terminal and the negative electrode terminal is inserted into the second mouth.

12. The prismatic secondary battery according to claim 11 further comprising a second insulating member attached to the second coining area.

13. The prismatic secondary battery according to claim 10, wherein:
the first insulating member is disposed between the one of the positive electrode terminal and the negative electrode terminal and the sealing plate, and
the second insulating member is disposed between the other of the positive electrode terminal and the negative electrode terminal and the sealing plate.

14. The prismatic secondary battery according to claim 10, wherein:

the first groove has a linear shape, and
the second groove has a linear shape.

15. The prismatic secondary battery according to claim 10, wherein:
the sealing plate further includes
a third groove formed on the front face; and
a fourth groove formed on the front face;
the third groove and the fourth groove stand apart from each other in the perpendicular direction to the first long side edge;
the first groove and the third groove stand apart from each other in a parallel direction to the first long side edge;
the second groove and the fourth groove stand apart from each other in the parallel direction to the first long side edge;
the third groove is formed between the first long side edge and the second coining area;
the fourth groove is formed between the second long side edge and the second coining area;
the positive electrode terminal being fixed to the sealing plate through the first mouth and a first insulating member attached to the first coining area;
the negative electrode terminal being fixed to the sealing plate through the second mouth and a second insulating member attached to the first coining area;

wherein:
the first groove has a linear shape,
the second groove has a linear shape,
the third groove has a linear shape, and
the fourth groove has a linear shape.

16. The prismatic secondary battery according to claim 1, wherein: the electrolyte pour hole is arranged between the first mouth and the gas release valve, and a length of the first groove in the longitudinal direction of the sealing plate is greater than a distance from the electrolyte pour hole to the first mouth[s] in the longitudinal direction of the sealing plate.

17. The prismatic secondary battery according to claim 1, wherein:
a concaved area is formed between the electrolyte pour hole and the first mouth, and
the first groove is arranged between the electrolyte pour hole and the first long side edge, between the concave area and the first long side edge, and between the first coining area and the first long side edge.

18. The prismatic secondary battery according to claim 5, wherein:
the sealing plate further includes a first linear shaped groove formed between the first groove and the first long side edge, and a second linear shaped groove formed between the second groove and the second long side edge.

* * * * *